United States Patent
Suzuki et al.

(10) Patent No.: US 6,561,716 B1
(45) Date of Patent: May 13, 2003

(54) UNIVERSAL JOINT DEVICE AND METHOD OF MANUFACTURING THE DEVICE

(75) Inventors: Yoshihiro Suzuki, Hamamatsu (JP); Hitoshi Sasaki, Hamamatsu (JP); Manabu Suzuki, Hamamatsu (JP); Kazuya Inagaki, Chiryu (JP)

(73) Assignee: Kabushiki Kaisha Somic Ishikawa, Tokyo (JP)

( * ) Notice: Subject to any disclaimer, the term of this patent is extended or adjusted under 35 U.S.C. 154(b) by 58 days.

(21) Appl. No.: 09/762,319

(22) PCT Filed: Jun. 1, 2000

(86) PCT No.: PCT/JP00/03541

§ 371 (c)(1),
(2), (4) Date: Feb. 6, 2001

(87) PCT Pub. No.: WO00/75520

PCT Pub. Date: Dec. 14, 2000

(30) Foreign Application Priority Data

Jun. 9, 1999 (JP) .............................. 11-163077

(51) Int. Cl.[7] ............................................... F16C 11/06
(52) U.S. Cl. ..................................................... 403/131
(58) Field of Search ................. 403/131, 135, 403/141, 263, 50, 128, 120, 22, 132, 133

(56) References Cited

U.S. PATENT DOCUMENTS

| 5,683,196 | A | * | 11/1997 | Toyoda et al. | ............... 403/120 |
| 5,743,669 | A | * | 4/1998 | Fujita et al. | ........... 29/898.051 |
| 5,860,757 | A | * | 1/1999 | Sugiura | ...................... 403/128 |
| 5,921,698 | A | * | 7/1999 | Hegen et al. | ............... 403/131 |
| 6,010,271 | A | * | 1/2000 | Jackson et al. | ............. 403/131 |

FOREIGN PATENT DOCUMENTS

| EP | 0742 375 A2 | 11/1996 | ........... F16C/11/06 |
| JP | 63297809 A | 12/1988 | ........... F16C/11/06 |
| JP | 3-99214 | 10/1991 | ........... F16C/11/06 |
| JP | 8-303447 | 11/1996 | ........... F16C/11/06 |

* cited by examiner

Primary Examiner—Robert E. Pezzuto
(74) Attorney, Agent, or Firm—Darby & Darby

(57) ABSTRACT

An adjustable joint unit includes a ball stud having a stud portion that is provided at one end thereof with a ball head portion, a bearing seat to contain the ball head portion, and a generally plate-shaped arm having a generally cylindrical socket portion. Also, an aperture portion permits the stud portion to be inserted therethrough. Additionally, the joint unit includes a mounting opening portion located at the base end of the socket portion, and a closing member which is adapted to be attached in such a manner as to close off the mounting opening portion at the base end of the socket portion and apply a given preliminary load to the ball head portion of the ball stud.

8 Claims, 5 Drawing Sheets

UNIVERSAL JOINT DEVICE AND METHOD OF MANUFACTURING THE DEVICE

TECHNICAL FIELD

The present invention relates to an adjustable joint unit including a generally plate-shaped arm having a socket portion to which a closing member is attached so that a ball head portion of a ball joint can slidably be contained in the socket portion. The invention also relates to a method of producing such an adjustable joint unit.

BACKGROUND OF THE INVENTION

Conventionally known examples of adjustable joint units provided with a generally plate-shaped arm having a socket portion to which a closing member is attached so that a ball head portion of a ball joint can slidably be contained in the socket portion is disclosed in Japanese Patent Public Disclosure No. 1998-100628.

The adjustable joint unit disclosed in Japanese Patent Public Disclosure No. 1998-100628 calls for pressing a steel plate so as to form a socket portion protruding from one of the two planar surfaces and a tubular portion on the other planar surface of the plate. The socket portion is formed in a generally cylindrical shape, and the vicinity of its outer end gradually or otherwise narrows towards the outer end, at which an aperture is opened. The tubular portion extends integrally and approximately coaxially with the socket portion. A bearing seat containing the ball head portion of a ball stud is housed in the socket portion, with the stud portion of the ball stud projecting from the aforementioned narrowing opening. A closing plate is fitted in the tubular portion's opening, which is located at the end opposite the narrowing opening of the socket portion, and rotatable rollers are rolled so that the tubular portion is crimped in such a manner as to be inclined inward. Then, with a given preliminary load applied to the ball head portion, the closing plate is attached to cover the opening of the tubular portion.

However, the structure disclosed in Japanese Patent Public Disclosure No. 1998-100628 is incapable of improving the manufacturability of adjustable joint units, because it is necessary to form a tubular portion for crimping and securing the closing plate during the pressing process of the socket portion.

Examples of structures that call for containing a ball head portion in a socket by crimping include those disclosed in Japanese Patent Publication No.1977-29374 or Japanese Patent Public Disclosure No. 1993-76961.

Japanese Patent Publication No. 1977-29374 and Japanese Patent Public Disclosure No. 1993-76961 relate to a structure including a generally cylindrical socket portion open at both ends, in other words having an aperture portion located at one end and a mounting opening portion at the other end, wherein the aperture portion and the mounting opening portion respectively permit the ball head portion and the stud portion of a ball stud to be inserted therethrough; the ball head portion is inserted from the mounting opening portion into the socket portion and contained therein, with a bearing seat between the ball head portion and the socket portion; a closing plate is fitted in the mounting opening portion; rotatable rollers are rolled so that the end of the socket portion where the mounting opening portion is located is crimped in such a manner as to be inclined inward; and a given preliminary load applied to the ball head portion, thereby firmly attaching the closing plate to and covering the mounting plate portion.

However, conventional structures disclosed in Japanese Patent Publication No. 1977-29374 or Japanese Patent Public Disclosure No. 1993-76961 make it necessary to form the vicinity of the rim of the mounting opening portion thin enough to permit its shape to be changed by crimping so as to be inclined inward, thereby enabling the attachment of the closing plate. As it is necessary to specially provide the socket portion with a thin portion, the structure described above is unable to improve the manufacturability of adjustable joint units. Forming the end of the socket portion where the mounting opening portion is located thin makes it easy to be crimped inward. On the other hand, it presents the possibility of the crimped portion being deformed in such a manner as to flare outward should an external stress be applied to the ball stud. Such a deformation of the crimped portion may result in displacement of the closing plate, which may cause the ball stud to slip off of the socket portion. Furthermore, as the degree of reshaping performed by crimping the vicinity of the mounting opening portion inward is limited by various factors, such as the strength of the material and the thickness of the portion to be crimped, the area where it is in contact with the closing plate, too, is reduced. Should the mounting strength of the closing plate be reduced to such an extent as to allow a gap to be formed between the closing plate and the crimped portion, it may result in undesirable problems, such as entry of water, sand, dust or other foreign substances from outside, undesirable seepage of lubricant, such as grease, or displacement of the closing plate, which may cause dislocation of the ball stud.

As described above, the structure disclosed in Japanese Patent Public Disclosure No. 1998-100628 is incapable of improving the manufacturability of adjustable joint units, because it is necessary to form a tubular portion for crimping and securing the closing plate during the pressing process of the socket portion.

As each structure disclosed in Japanese Patent Publication No. 1977-29374 or Japanese Patent Public Disclosure No. 1993-76961 requires the vicinity of the rim of the mounting opening portion to be thin enough to permit its shape to be changed by crimping so as to be inclined inward, they are not only unable to improve the manufacturability of adjustable joint units but also present a problem in that the closing plate may not be attached with sufficient reliability.

In order to solve the above problem, an object of the present invention is to provide an adjustable joint unit which offers stable characteristics and improved manufacturability. Another object of the invention is to provide and a method of producing such an adjustable joint unit.

DISCLOSURE OF THE INVENTION

An adjustable joint unit according to the invention includes a ball stud having a stud portion that is provided at one end thereof with a ball head portion, a bearing seat which serves to contain said ball head portion in such a manner as to permit the ball head portion to slide therein and has an insertion hole through which said stud portion is adapted to be inserted, a generally plate-shaped arm having a generally cylindrical socket portion which serves to contain said bearing seat and is formed by a pressing process so as to have an axis extending in the same direction as the thickness of the arm and be open at both ends, with an aperture portion that permits said stud portion to be inserted therethrough being formed at the protruding end, i.e. the end facing the direction in which the socket portion protrudes, and a mounting opening portion at the base end of the socket portion, and a closing member which is adapted to be attached in such a manner as to close off the mounting opening portion at the base end of the socket portion and apply a given preliminary load to the ball head portion of the ball stud, wherein said socket portion of the arm has a crimped portion provided along the inner rim of said mounting opening portion and adapted to receive and hold the outer rim of said closing member, said crimped portion formed by crimping into a flange-like shape that extends inward and formed in steps having different thicknesses, with the inner step thinner than the outer step. As the inner rim of the mounting opening portion of the socket portion, which has been formed by pressing a generally plate-shaped arm, is crimped to form a crimped portion adapted to receive and hold the outer rim of said closing member and having a flange-like shape that extends inward and formed in steps having different thicknesses, with the inner step thinner than the outer step, the structure according to the invention increases the area of the surface where the closing member is received and held, and ensures the reliable contact and fixation of the closing member, thereby offering stable characteristics. Furthermore, the increased surface where the closing member is received and held improves the sealing ability of the adjustable joint unit and prevents entry of water, sand, dust or other foreign substances, undesirable seepage of lubricant, or other similar problems.

According to another feature of the invention, the crimped portion of an adjustable joint unit has a first step portion, which is formed along the inner rim of the mounting opening portion of the socket portion by crimping so as to extend inward in a flange-like shape, and a second step portion which is formed along the edge of the first step portion by crimping so as to extend inward in flange-like shape. As the crimped portion is formed by crimping the inner rim of the mounting opening portion of the socket portion to form a first step portion, which extends inward in a flange-like shape, and then crimping the edge of the first step portion so as to form a second step portion extending inward in a flange-like shape, the invention facilitates formation of a crimped portion which ensures the reliable contact and fixation of the closing member with an increased area of the surface in contact with the closing member, and has stable characteristics and improved sealing ability.

The crimped portion of an adjustable joint unit according to yet another feature of the invention is formed by a crimping process, which is conducted by rolling rotatable rollers along the inner rim of the mounting opening portion of the socket portion. As the crimped portion is formed by rolling the rollers along the inner rim of the mounting opening portion, the crimped portion can be formed easily and reliably.

A method of producing an adjustable joint unit according to the invention comprises the steps such that an arm is formed by pressing a generally plate-shaped arm base member so as to form a generally cylindrical socket portion having an axis extending in the same direction as the thickness of the arm and open at both ends, with an aperture portion at the protruding end and a mounting opening portion at the base end of the socket portion; a ball head portion of a ball stud is inserted from said mounting opening portion into the socket portion of the arm and contained therein, with a bearing seat between the ball head portion and the socket portion; a closing member is fitted in and thereby closes off said mounting opening portion of the socket portion; and that a crimped portion adapted to receive and hold the outer rim of said closing member is formed by crimping the inner rim of said mounting opening portion so as to extend inward in a flange-like shape that consists of steps having different thicknesses, with the inner step thinner than the outer step. As the inner rim of the mounting opening portion of the socket portion, which has been formed by pressing an arm base member, is crimped to form a crimped portion adapted to receive and hold the outer rim of said closing member and having a flange-like shape that extends inward and consists of different steps so that the crimped portion is thinner at its inner edge than is at its base end, the structure described according to the invention increases the area of the surface where the closing member is received and held, and ensures the reliable contact and fixation of the closing member, thereby offering stable characteristics. Furthermore, the increased surface where the closing member is received and held improves the sealing ability of the adjustable joint unit and prevents entry of water, sand, dust or other foreign substances, undesirable seepage of lubricant, or other similar problems.

A method of producing an adjustable joint unit according to another feature of the invention calls for forming a crimping portion so as to have steps having different thicknesses, with the inner step thinner than the outer step, by forming a first step portion, which extends inward like a flange, along the inner rim of the mounting opening portion of the socket portion, and then crimping the edge of the first step portion so as to form a second step portion extending inward like a flange. As the crimped portion is formed by crimping the inner rim of the mounting opening portion to form a first step portion, which extends inward in a flange-like shape, and then crimping the edge of the first step portion so as to form a second step portion extending inward in a flange-like shape, the invention facilitates formation of a crimped portion which ensures the reliable contact and fixation of the closing member with an increased area of the surface in contact with the closing member, and has stable characteristics and improved sealing ability.

A method of producing an adjustable joint unit according to yet another feature of the invention calls for forming a crimping portion by a crimping process, which is conducted by rolling rotatable rollers along the inner rim of the mounting opening portion of the socket portion. As the crimped portion is formed by rolling the rollers along the inner rim of the mounting opening portion, the crimped portion can be formed easily and reliably.

PREFERRED EMBODIMENT OF THE INVENTION

Next, the structure of an adjustable joint unit according to an embodiment of the present invention is explained hereunder, referring to FIGS. 1 through 5.

Figure 1:
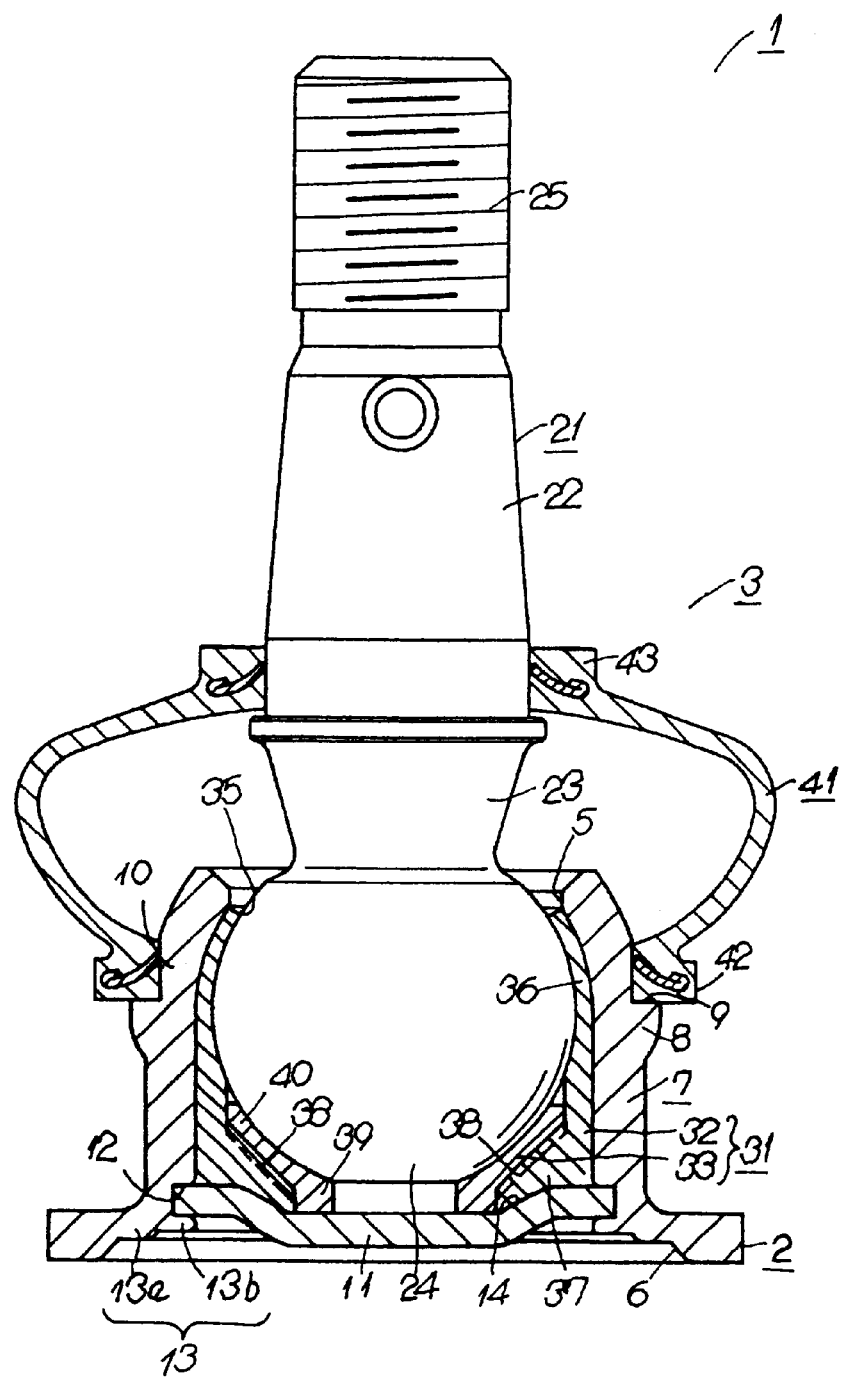
FIG. 1 is an end elevation of an adjustable joint unit according to an embodiment of the present invention.
Figure 2:
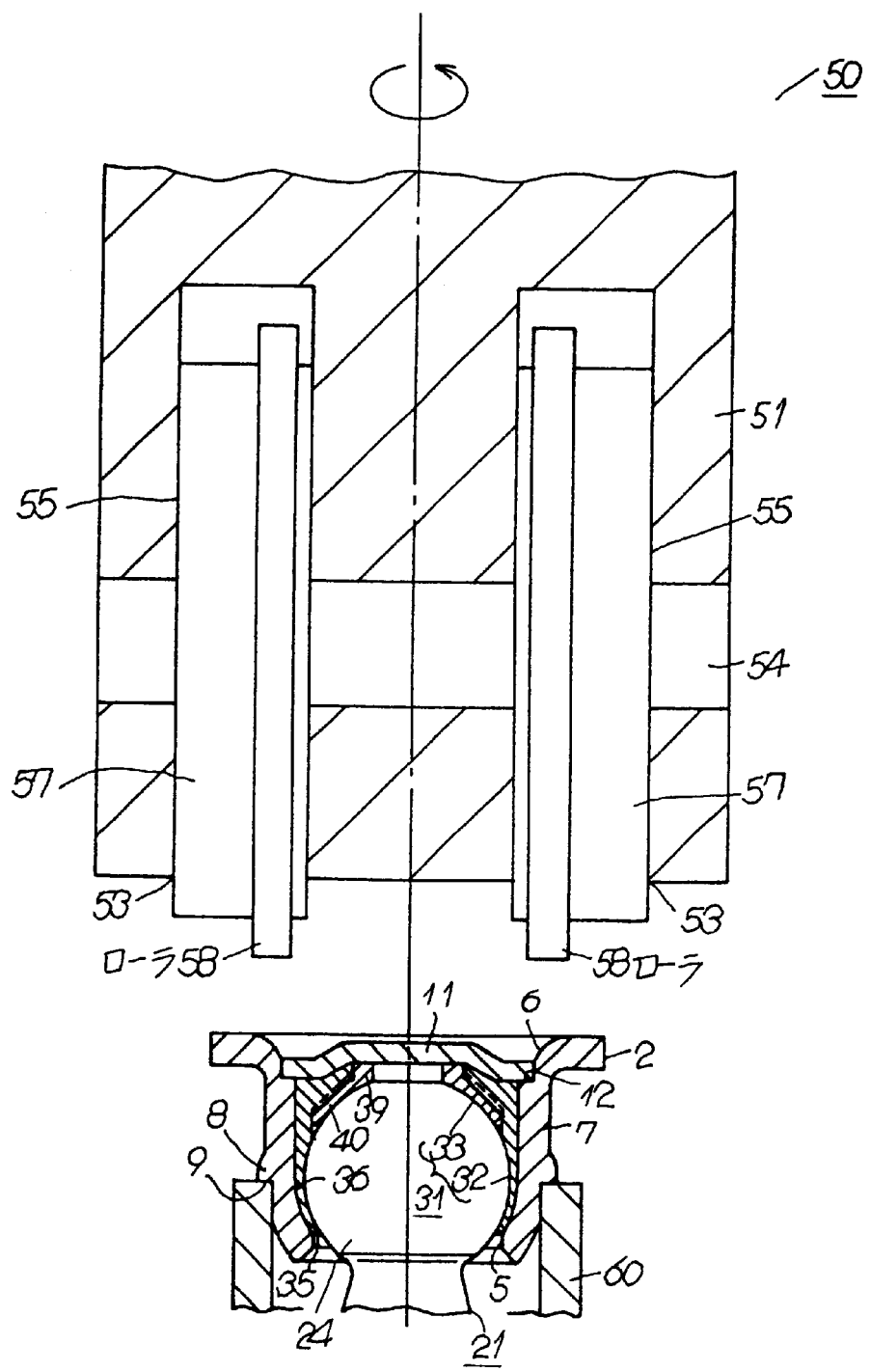
FIG. 2 is a sectional front view illustrating how the crimped portion of said adjustable joint unit is formed.
Figure 3:
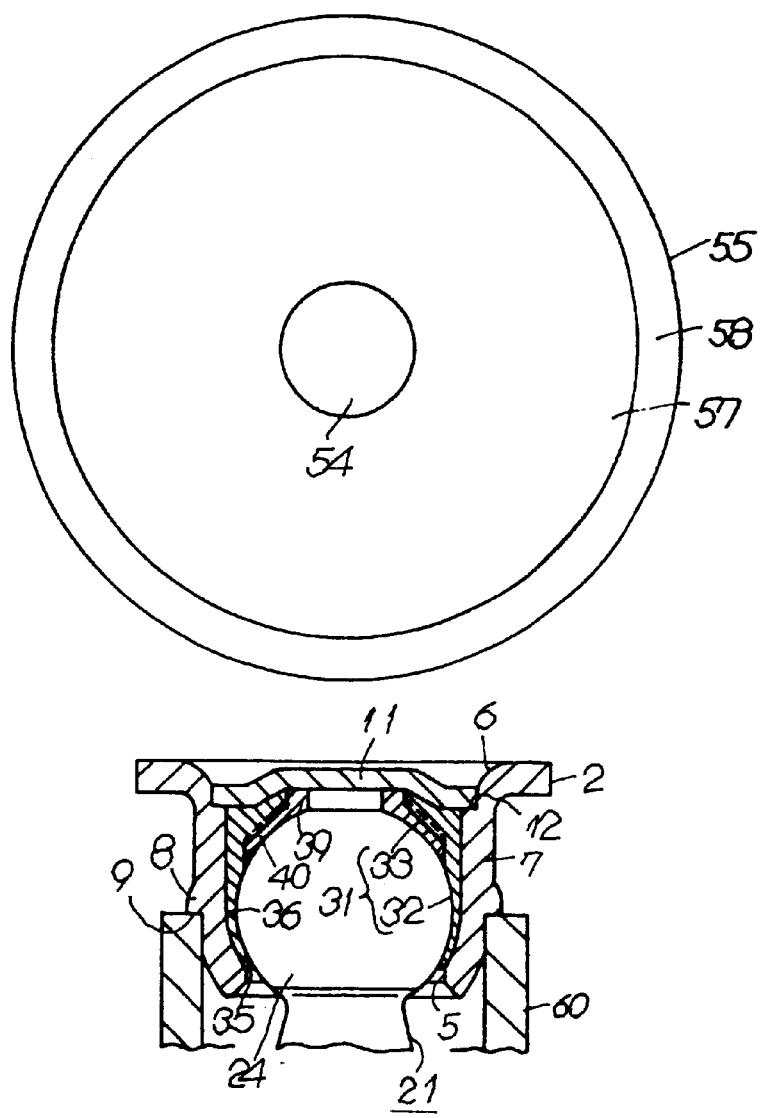
FIG. 3 is a sectional side view illustrating how the crimped portion of said adjustable joint unit is formed.
Figure 4:
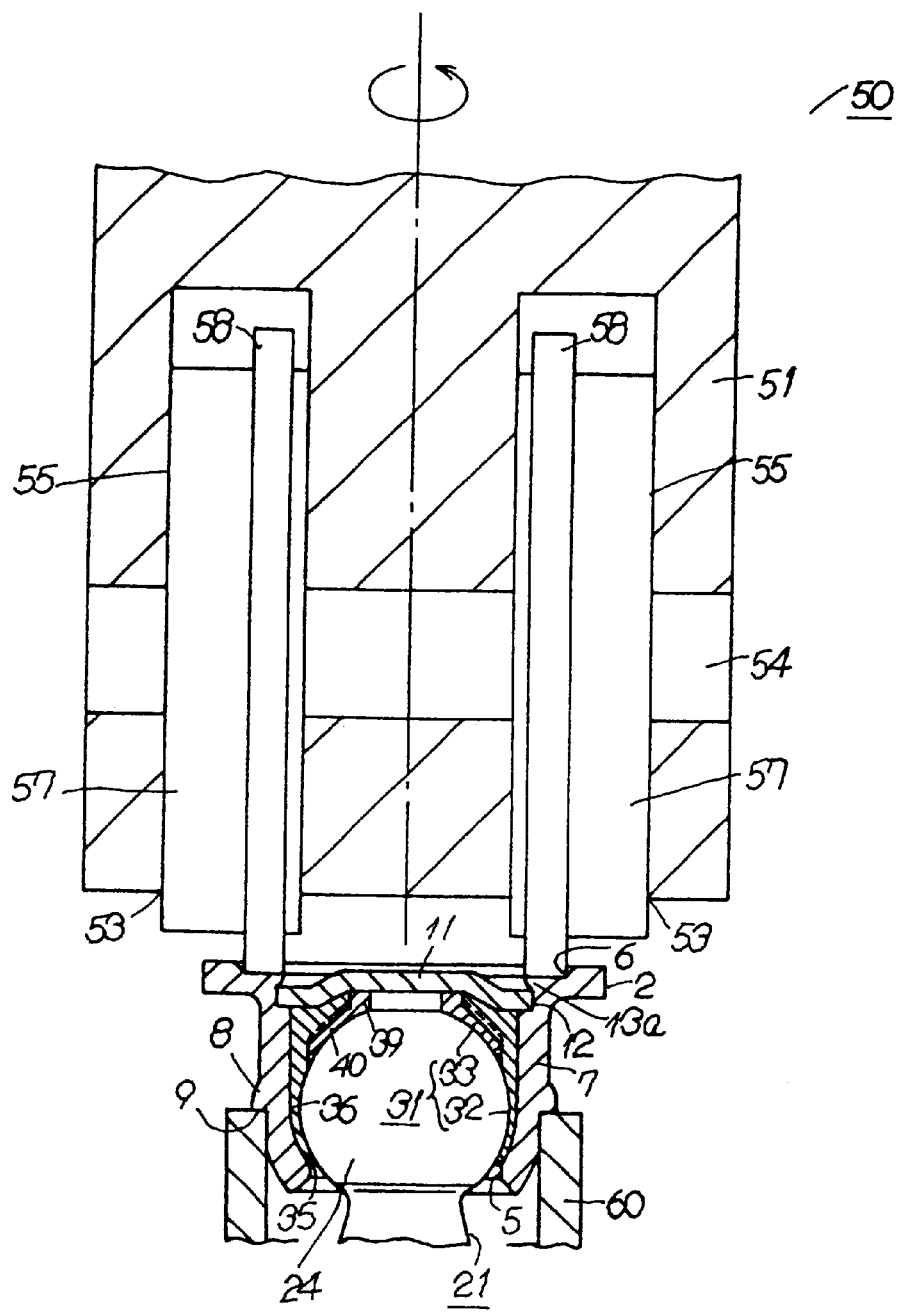
FIG. 4 is a sectional front view illustrating how the first step portion of the crimped portion of the adjustable joint unit is formed.
Figure 5:
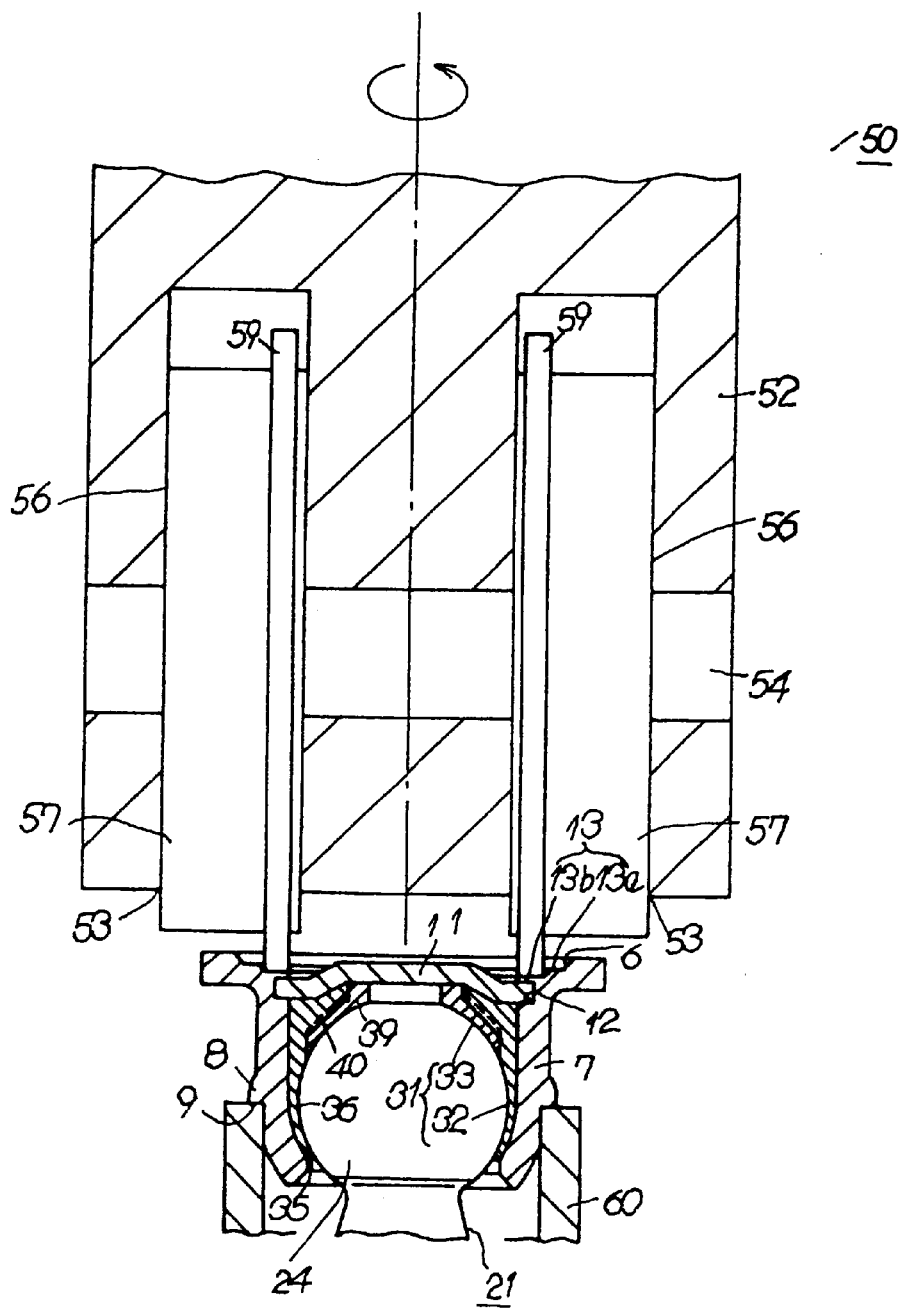
FIG. 5 is a sectional front view illustrating how the second step portion of the crimped portion of the adjustable joint unit is formed.

Referring to FIG. 1, numeral 1 denotes the body of an adjustable joint unit which may be used in a suspension mechanism of an automobile. The adjustable joint unit body 1 includes an arm 2. The arm 2 is formed of an arm base member, which may be a narrow, strip-shaped steel plate. A ball joint portion 3 is provided at one of the longitudinal ends of the arm 2.

To be more specific, a generally cylindrical socket portion 7 is extended from one of the longitudinal ends of the arm 2 by pressing in such a manner that the axis of the socket portion 7 extends in the same direction as the thickness of the arm 2. The socket portion 7 is open at both ends, with an aperture portion 5 at the protruding end of the socket portion 7, i.e. the end facing the direction in which the socket portion 7 protrudes, and a mounting opening portion 6 at the base end of the socket portion 7. The aperture portion 5 is formed in a dome-like shape that narrows towards the protruding end of the socket portion 7. A brim portion 8 extending outward like a flange is formed on the outer cylindrical surface of the socket portion 7. The rim of the brim portion 8 facing towards the aperture portion 5 is formed into a positioning step portion 9, which is a surface approximately perpendicular to the axis of the socket portion 7. Also formed on the outer cylindrical surface of the socket portion 7 is an approximately cylindrical tubular portion 10 located closer to the protruding end of the socket portion 7 than is the brim portion 8.

A generally disk-shaped closing plate 11 serving as a closing member is integrally attached to the mounting opening portion 6 of the socket portion 7 of the arm 2 so as to cover the mounting opening portion 6. An abutting portion 12 is formed along the inner surface of the portion near the mounting opening portion 6 of the socket portion 7 by grooving the inner wall of the socket portion 7 so that the diameter of the grooved portion is nearly the same as the outer diameter of the closing plate 11. A crimped portion 13 is formed along the lip of the mounting opening portion 6 of the socket portion 7. The crimped portion 13 protrudes inward like a flange so as to abut against the outer edge of the closing plate 11.

The crimped portion 13 has a thick first step portion 13a, which is located at the base end adjacent to the inner rim of the mounting opening portion 6 and adapted to support the closing plate 11, and a thinner second step portion 13b, which forms the portion leading to the edge and is adapted to abut and receive the vicinity of the outer edge of the outer surface of the closing plate 11. In other words, the second step portion 13b is thinner than the first step portion 13a and formed along the inner circumferential edge of the first step portion 13a so that the outer surface of the crimped portion 13 is formed in steps, with the inner portion thinner than the base end portion of the crimped portion.

A seat surface portion 14 is formed by expanding the approximate center and the surrounding region of the closing plate 11 in one direction by embossing or other appropriate method so that the seat surface portion 14 looks like a round concavity when viewed from the opposite direction.

A metal ball stud 21 is attached to the socket portion 7. The ball stud 21 has a bar-shaped stud portion 22 adapted to be snugly inserted into the aperture portion 5 of the socket portion 7, with one end of the stud portion 22 projecting from the socket portion 7. A generally peripheral ball head portion 24, which is adapted to be contained in the socket portion 7, is formed at the other end of the stud portion 22, with a small diameter portion 23 formed between the ball head portion 24 and the stud portion 22. An external thread portion 25 is formed at the tip, i.e. the earlier mentioned end of the stud portion 22.

A bearing seat 31 is disposed inside the socket portion 7, at a location between the ball head portion 24 of the ball stud 21 and the inner surface of the socket portion 7. The bearing seat 31 consists of a ball seat 32 and a cushion 33. The ball seat 32 is formed of a hard synthetic resin, such as polyacetal resin, that has good bearing characteristics and a great ability to withstand load, as well as sufficient rigidity and elasticity. The cushion 33 is formed of a relatively soft resin material, e.g. polyurethane resin.

The ball seat 32 has a cylindrical body portion 36 having a generally cylindrical shape. An insertion hole 35 adapted to receive and contain the ball head portion 24 of the ball stud 21 is formed at an end of the cylindrical body portion 36. A bottom portion 37 extending inward like a flange as an integral body with the cylindrical body portion 36 is formed at the other end of the cylindrical body portion 36. The cylindrical body portion 36 and the bottom portion 37 thus constitute the ball seat 32 so that the ball seat 32 has a generally cylindrical shape with a bottom. A plurality of radially arranged raised portions 38 that rise inward are formed on the inner surface of the bottom portion 37.

The cushion 33 is formed in the shape like a ring which can be fitted in the bottom portion 37 of the ball seat 32. A seating portion 39 adapted to come into contact with the seat surface portion 14 of the closing plate 11, which will be attached to the socket portion 7, is provided around one of the rims of the cushion 33. A slide portion 40 extending like a flange is integrally formed along the other rim of the cushion 33 so that the outer face of the slide portion 40 will rest on the inner surface of the bottom portion 38 and that the ball head portion 24 will be slidably in contact with the inner surface of the slide portion 40.

The bearing seat 31 is formed by fitting the cushion 33 into the bottom portion 37 of the ball seat 32 in such a manner that the outer surface of the slide portion 40 is in close contact with the ends of the raised portions 38,38. The bearing seat 31 is contained in the socket portion 7 in such a state as to be assembled as an integral body having a generally cylindrical shape with a bottom, with the insertion hole 35 facing the aperture portion 5. The ball head portion 24 of the ball stud 21 is slidably contained in the bearing seat 31 in such a state that the stud portion 22 of the ball stud 21 projects out of the insertion hole 35 of the ball seat 32 of the bearing seat 31 and the aperture portion 5 of the socket portion 7.

A dust cover 41 is attached to the ball joint portion 3. The dust cover 41 is formed in a generally cylindrical shape. A generally ring-shaped first fitting portion 42 is provided along an end of the dust cover 41. The first fitting portion 42 has an end face adapted to come into contact with the positioning step portion 9 of the socket portion 7 and fitted around the outer cylindrical surface of the tubular portion 10 of the socket portion 7. A generally ring-shaped second fitting portion 43 adapted to be fitted around the stud portion 22 of the ball stud 21 is provided along the other end of the dust cover 41. When assembled, the first fitting portion 42 of the dust cover 41 is fitted around the tubular portion 10 of the socket portion 7. Then, with the second fitting portion 43 of the dust cover 41 fitted around the stud portion 22 of the ball stud 21, the dust cover 41 is attached to the socket portion 7. Thus, the ball joint portion 3 is provided at one end of the arm 2.

Next, how the embodiment of the adjustable joint unit body 1 described above is produced is explained hereunder.

First of all, an end of a narrow, strip-shaped arm base member (not shown) formed of a steel plate is pressed with the pressure being applied in the same direction as the thickness of the arm base member so that a socket portion 7 that protrudes from one of the two planar surfaces of the arm base member is formed at the aforementioned end of the arm base member. To be more specific, an aperture portion 5 that has a dome-like shape with the top of its protruding end cut off and open is formed so that the diameter of the aperture portion 5 decreases toward its end and the axis of the socket portion extending in the same direction as the thickness of the arm base member, where as the mounting opening portion 6 is formed at the base end of the socket portion 7. Then, the abutting portion 12 is formed along the inner surface of the portion near the mounting opening portion 6 of the arm base member. During the pressing process, a part of the outer rim of the socket portion 7, i.e. the portion where the aperture portion 5 is located, is pressed to move the surplus portion of the material from the protruding end, at which the aperture portion 5 is open, in such a manner as to remove a part of the outer rim portion. By thus moving the surplus portion of the material, a brim portion 8 protruding outward like a flange is formed on the outer cylindrical surface of the socket portion 7. Thus, the arm 2 is formed.

The arm 2 formed by pressing is set in a crimping machine 50. As shown in FIGS. 2 through 5, the crimping machine 50 has a pair of supporting portions 51,52, each of which has a vertically extending center axis and is capable of moving up and down and rotating around the center axis. A pair of recesses 53,53 that are open downward are formed at the end of each supporting portion 51/52. Each supporting portion 51/52 is also provided with a shaft portion 54, which is supported in such a state as to extend horizontally and pass through the two recesses 53,53. A processing roller 55/56 rotatably supported by the shaft portion 54 is disposed in each recess 53.

Each processing roller 55/56 has a generally cylindrical base seat portion 57 and a roller 58/59, which has a diameter larger than that of the base seat portion 57 and is coaxially disposed around the base seat portion 57. The thickness, i.e. the axial length, of the base seat portion 57 of each processing roller 55 disposed in the supporting portion 51 is nearly the same as that of the base seat portion 57 of each processing roller 56 disposed in the other supporting portion, i.e. the supporting portion 52. Furthermore, the rollers 58,59 are formed such that the roller 58 of each processing roller 55 disposed in the supporting portion 51 is thicker than the roller 59 of each processing roller 56 disposed in the other supporting portion 52. The rollers 58,59 of the processing rollers 55,56 are disposed around the outer surface of the base seat portions 57,57 at respective locations such that the distance between the roller 58 of each processing roller 55 disposed in the supporting portion 51 and the rotation axis of the supporting portion 51 is longer than the distance between the roller 59 of each processing roller 56 disposed in the other supporting portion 52 and the rotation axis of the supporting portion 52.

The crimping machine 50 is also provided with a cylindrical support stand 60 that extends upward. The support stand 60 is designed such that the tubular portion 10 of the socket portion 7 of the arm 2 can be snugly inserted therein, with the positioning step portion 9 of the brim portion 8 of the socket portion 7 coming into contact with the end of the support stand 60.

Then, the arm 2 is placed and secured on the support stand 60. To be more specific, the tubular portion 10 of the socket portion 7 of the arm 2 formed by pressing is inserted into the support stand 60 of the crimping machine 50 with the aperture portion 5 head-first so that the positioning step portion 9 of the brim portion 8 comes into contact with the end of the support stand 60. In the state that the bearing seat 31 is attached to the ball head portion 24, the stud portion 22 of the ball stud 21 is inserted from the mounting opening portion 6, and thus inserted stud portion 22 is projected from the aperture portion 5 of the socket portion 7. Thus, the ball head portion 24 to which the bearing seat 31 is attached is contained in the socket portion 7.

Thereafter, the mounting opening portion 6 is closed off by bringing the outer edge of the closing plate 11 into contact with the abutting portion 12 of the socket portion 7. In this state, the supporting portion 51 of the crimping machine 50 is positioned so that the rotation axis of the supporting portions 51 is located directly above the center axis of the socket portion 7, and the supporting portions 51 is moved downward. Then, in the state where the rollers 58 of the processing rollers 55 are in contact with the inner rim of the mounting opening portion 6, the supporting portion 51 is rotated so as to roll the rollers 58 along the inner rim of the mounting opening portion 6. As a result of the rotation of the rollers 58, the inner rim of the mounting opening portion 6 is crimped so that the first step portion 13*a* that extends inward in a flange-like shape is formed.

Then, in the place of the supporting portion 51, the other supporting portion 52 is positioned likewise so that the rotation axis of the supporting portions 52 is located directly above the center axis of the socket portion 7, and the supporting portions 52 is moved downward. Then, in the state where the rollers 59 of the processing rollers 56 are in contact with the end of the first step portion 13*a*, the supporting portion 52 is rotated so as to roll the rollers 59 along the inner edge of the first step portion 13*a*. As a result of the rotation of the rollers 59, the end portion of the first step portion 13*a* is crimped so that the second step portion 13*b* extending inward in a flange-like shape is formed. Thus, the crimped portion 13 adapted to receive the outer edge of the closing plate 11 is formed in the shape of a plurality of steps so that the inner portion of the crimped portion 13 is thinner than the base end thereof. With the closing plate 11 attached to the socket portion 7, the formation of the ball joint portion 3 is completed.

Thereafter, the arm 2 is removed from the support stand 60 of the crimping machine 50, and the first fitting portion 42 of the dust cover 41 is brought into contact with the positioning step portion 9 of the brim portion of the socket portion 7. While the dust cover 41 is thus positioned, the first fitting portion 42 is fitted around the tubular portion 10 formed around the outer cylindrical surface of the socket portion 7. The second fitting portion 43 provided at the other end of the dust cover 41 is fitted around the stud portion 22 of the ball stud 21. With the dust cover 41 thus attached to the ball joint portion 3, assembly of the adjustable joint unit body 1 is completed.

As described above, the crimped portion 13, to which the closing plate 11 will be attached, is crimped into a flange-like shape that consists of steps having different thicknesses so that the crimped portion is thinner at its inner portion than the outer portion. Therefore, there is no need of providing the arm 2 with a portion for forming a crimped portion 13, whereas conventional structures necessitate such a portion. Furthermore, as the crimped portion 13 is rolled so as to protrude inward in a plurality of steps, the distance by which the crimped portion 13 protrudes inward is increased compared with the conventional methods. Thus, the embodiment described above provides a simple structure that increases the area where the closing plate 11 is in contact with the crimped portion 13 and also facilitates formation of the crimped portion 13 that enables the closing plate 11 to be reliably attached in the state where a stable preliminary load is applied to the ball head portion 24. As a result, stable characteristics can easily be obtained. Furthermore, the increased contact surface between the closing plate 11 and the crimped portion 13 improves the ability of sealing the gap between the closing plate 11 and the crimped portion 13, thereby preventing, for example, entry of foreign substances, such as water, sand or dust, or undesirable seepage of lubricant used for containing the ball head portion 24 in the state where it is allowed to slide smoothly in the socket portion 7. Therefore, the embodiment described above not only ensures stable characteristics that can easily be maintained for a long period of time but also improves the manufacturability of adjustable joint units.

As the crimped portion 13 is so formed in steps having different thicknesses, with the inner step thinner than the outer step, by forming a first step portion 13a, which extends inward like a flange, along the inner rim of the mounting opening portion 6 of the socket portion 7, and then crimping the edge of the first step portion 13a so as to form a second step portion 13b extending inward like a flange. As a result of this structure, the crimped portion 13 can easily be formed by the rollers 58,59, each of which has a simple structure with a cylindrical outer surface.

As the embodiment described above calls for rolling the rollers 58,59 along the inner rim of the mounting opening portion 6 of the socket portion 7, the outer rim of the closing plate 11 can be secured evenly so that stable characteristics can easily be obtained.

The dust cover 41 is positioned and supported by the brim portion 8, which is formed on the socket portion 7 in order to place and secure the arm 2 on the crimping machine 50 that serves to form the crimped portion 13 by crimping. Therefore, the embodiment described above is more convenient to produce, because it eliminates the necessity of a separate structure to position and support the dust cover 41.

The brim portion 8 may be provided at a location from which the socket portion 7 becomes narrower, and the outer cylindrical surface of the tubular portion 10 is so positioned as to face the portion near the inner rim of the mounting opening portion 6. This structure is capable of preventing the socket portion 7 from being displaced from the support stand 60 or deformed or otherwise damaged by the pressure applied when the crimped portion 13 is being crimped.

Each processing roller 55/56 of the crimping machine 50 may be comprised of a base seat portion 57 and a roller 58/59, with all the base seat portions 57,57 having the same thickness. As a result of this structure, the recesses 53,53 of the supporting portions 51,52 adapted to support the processing rollers 55,56 can be formed to have the same dimensions. Such a structure has a benefit in that the crimping machine 50 can be produced at low cost, because supporting portions 51,52 of identical shape may be used. Furthermore, by setting the rollers 58,59 at appropriate positions in the base seat portions 57,57, the steps of the crimped portion may have variable forms. Therefore, the invention is applicable also to forming adjustable joint unit bodies 1 that are respectively provided with ball joint portions 3 having different characteristics.

Usage of the embodiment described above is not limited to an adjustable joint unit body used in the suspension mechanism of an automobile; it is applicable to an adjustable joint unit of any type.

According to the embodiment described above, the crimped portion 13 is formed by crimping and consists of two steps, i.e. a first step portion 13a and a second step portion 13b, so that the crimped portion 13 is thinner at its inner edge than is at its base end. However, the crimped portion 13 may be formed by crimping so as to have three or more steps.

Although the invention has been explained referring to the embodiment wherein a crimping machine 50 having processing rollers 55,56 with rollers 58,59 that are disposed in the base seat portions 57 is used for crimping, the crimping process does not necessarily have to use rollers 58,59; it can be done by any other crimping method.

Furthermore, each roller 58/59 is disposed in a base seat portion 57 according to the embodiment described above. However, instead of using the base seat portions 57, the rollers 58/59 may be disposed in the supporting portions 51/52 in the state where the rollers 58/59 are directly supported by the shaft portion 54 attached thereto.

Although the invention has been explained referring to the embodiment wherein a socket portion 7 having an aperture portion 5 at one of its end is formed by pressing and forming a brim portion 8 around the outer surface of the socket portion 7, these portions may be formed by any other method; an example of other applicable methods may be comprised of steps of forming a socket portion 7 in a dome-like shape without an aperture portion 5, providing the socket portion 7 with a brim portion 8, and then opening an aperture portion 5 in the socket portion 7. Or, according to yet another method, a socket portion 7 protruding in a generally cylindrical shape may be formed by pressing a steel plate, and, thereafter, the end of the socket portion 7 may be formed into a dome-like shape having a brim portion 8.

POSSIBLE INDUSTRIAL APPLICATION

As described above, an adjustable joint unit according to the present invention may be used, for example, in a link mechanism for linking a ride height sensor arm and the suspension of an automobile.

What is claimed is:
1. An adjustable joint unit comprising:
   a ball stud, comprising:
      a stud portion; and
      a ball head portion opposite said stud portion;
   a bearing seat slidingly containing said ball head portion, comprising:
      an insertion hole adapted to receive said stud portion;
   a generally plate-shaped arm having a thickness, comprising:
      a generally cylindrical socket portion being open at both ends and containing said bearing seat, comprising:
         a protruding end;
         a base end opposite said protruding end;
         an axis extending in the direction of said thickness of said arm;
         an aperture portion disposed at said protruding end and allowing said stud portion to protrude therethrough;
         a mounting opening portion disposed at said base end and comprising an inner rim; and
         a crimped portion disposed along said inner rim comprising:
            a flange-like shape;
            an outer step; and
            an inner step thinner than said outer step; and
      a closing member adapted to close said mounting opening portion and applying a preliminary load to said ball head portion, comprising an outer rim, wherein said inner rim receives and holds said outer rim of said closing member.

2. An adjustable joint unit as claimed in claim 1, wherein said crimped portion further comprises:

a first step portion disposed along said inner rim of said mounting opening portion of said socket portion, said first step portion comprising a flange-like shape and extending toward said closing member, and a second step portion disposed along an edge of said first step portion, said second step portion comprising a flange-like shape and extending toward said closing member.

3. An adjustable joint unit as described in claim 1, wherein said crimped portion is formed by a crimping process, comprising rolling rotatable rollers along said inner rim of said mounting opening portion of said socket portion.

4. An adjustable joint unit as described in claim 2, wherein said crimped portion is formed by a crimping process, comprising rolling rotatable rollers along said inner rim of said mounting opening portion of said socket portion.

5. A method of producing an adjustable joint unit comprising steps of:

forming an arm by pressing a generally plate-shaped arm base member said arm comprising a thickness, so as to form a generally cylindrical socket portion having an axis extending in the same direction as said thickness of said arm and open at both ends, said socket portion comprising an aperture portion at a protruding end and a mounting opening portion at a base end of said socket portion;

inserting a ball head portion of a ball stud through said mounting opening portion into said socket portion of said arm;

disposing a bearing seat between said ball head portion and said socket portion;

fitting a closing member into said mounting opening portion of said socket portion to close off said mounting opening portion; and forming a crimped portion adapted to receive and hold an outer rim of said closing member by crimping an inner rim of said mounting opening portion, said crimped portion extends inward in a flange-like shape and comprises steps having different thicknesses, an inner step thinner than an outer step.

6. A method of producing an adjustable joint unit as claimed in claim 5, further comprising the steps:

forming the crimped portion by forming a first step portion along said inner rim, said first step portion extending inward like a flange, and crimping an edge of said first step portion so as to form a second step portion extending inward like a flange, said crimped portion comprises one or more steps having different thicknesses, wherein said inner step being thinner than said outer step.

7. A method of producing an adjustable joint unit as described in claim 5, further comprising the steps:

forming said crimping portion by a crimping process, said crimping process comprising the steps:
rolling rotatable rollers along said inner rim of said mounting opening portion of said socket portion.

8. A method of producing an adjustable joint unit as described in claim 6, further comprising the steps:

forming said crimping portion by a crimping process, said crimping process comprising the steps:
rolling rotatable rollers along said inner rim of said mounting opening portion of said socket portion.

* * * * *